(12) United States Patent
Arnault et al.

(10) Patent No.: US 9,344,524 B2
(45) Date of Patent: May 17, 2016

(54) METHOD, SYSTEM AND COMPUTER PROGRAM PRODUCT FOR PROVIDING COMPOSITE WEB APPLICATION

(71) Applicant: Thibaud Arnault, Orsay (FR)

(72) Inventors: Thibaud Arnault, Orsay (FR); Arnaud Richard, Orsay (FR)

(73) Assignee: Thibaud Arnault, Orsay (FR)

( * ) Notice: Subject to any disclaimer, the term of this patent is extended or adjusted under 35 U.S.C. 154(b) by 150 days.

(21) Appl. No.: 14/368,278

(22) PCT Filed: Dec. 19, 2012

(86) PCT No.: PCT/EP2012/076084
§ 371 (c)(1),
(2) Date: Jun. 23, 2014

(87) PCT Pub. No.: WO2013/092661
PCT Pub. Date: Jun. 27, 2013

(65) Prior Publication Data
US 2014/0344403 A1    Nov. 20, 2014

(30) Foreign Application Priority Data
Dec. 22, 2011   (EP) .................................... 11368029

(51) Int. Cl.
*G06F 15/16* (2006.01)
*H04L 29/08* (2006.01)

(52) U.S. Cl.
CPC ................ *H04L 67/32* (2013.01); *H04L 67/02* (2013.01); *H04L 67/2838* (2013.01)

(58) Field of Classification Search
CPC ...... H04L 67/32; H04L 67/02; H04L 67/2838
USPC .................................................. 709/203, 217
See application file for complete search history.

(56) References Cited

U.S. PATENT DOCUMENTS

| | | | | |
|---|---|---|---|---|
| 8,805,875 | B1 * | 8/2014 | Bawcom et al. | 707/770 |
| 9,081,873 | B1 * | 7/2015 | Bawcom et al. | 1/1 |
| 2011/0196914 | A1 | 8/2011 | Tribbett | |
| 2012/0254827 | A1 * | 10/2012 | Conrad et al. | 717/104 |
| 2013/0041925 | A1 * | 2/2013 | Balko | 707/810 |
| 2013/0104100 | A1 * | 4/2013 | Mueller | 717/106 |
| 2014/0047413 | A1 * | 2/2014 | Sheive et al. | 717/110 |
| 2014/0344403 | A1 * | 11/2014 | Arnault et al. | 709/217 |

OTHER PUBLICATIONS

Xuanzhe Liu, et al., "Towads Service Composition Based on Mashup", 2007 IEEE Congress on Services, Jul. 1, 2007, pp. 332-339, IEEE, Piscataway, NJ, USA, XP031119620.
Joyce El Haddad, et al., "A Hierarchical Model for Transactional Web Service Composition in P2P Networks", 2007 International Conference on Web Services, Jul. 1, 2007, pp. 346-353, IEEE, XP031119935.

* cited by examiner

*Primary Examiner* — Michael Y Won
(74) *Attorney, Agent, or Firm* — Baker & Hostetler LLP

(57) ABSTRACT

A method and system for providing composite web application is provided. The method operates at a server computer to receive a client request in the form of an API language request, having a plurality of CLI commands for querying Web services. The process allows generating an Abstract Syntax Tree (AST) from the client request and sequentially executing each node of the AST to query the Web services. All web data received are combined into a composite data structure send back in the form of an API language response to the originator.

12 Claims, 4 Drawing Sheets

METHOD, SYSTEM AND COMPUTER PROGRAM PRODUCT FOR PROVIDING COMPOSITE WEB APPLICATION

CROSS-REFERENCE TO RELATED APPLICATIONS

This application is a National Stage of International patent application PCT/EP2012/076084, filed on Dec. 19, 2012, which claims priority to foreign European patent application No. EP 11368029.2, filed on Dec. 22, 2011, the disclosures of which are incorporated by reference in their entirety.

FIELD OF THE INVENTION

The present invention relates to Web Servers and more particularly to a method and system for providing composite Web Application.

BACKGROUND OF THE INVENTION

The common function of a Web server is to deliver web pages on a request to client computers. A client, generally through a web browser or web crawler, initiates a communication by sending a request for a specific resource to the Web server and the latter sends back a response with the content of the resource or eventually with an error message if unable to do so.

The World Wide Web Consortium (W3C) defines a Web service or Web application as a software system designed to support interoperable machine-to-machine interaction over a network. It has an interface described in a machine-processable format (specifically Web Services Description Language, known by the acronym WSDL). Other systems interact with the Web service in a manner prescribed by its description using SOAP standard messages, typically conveyed using HTTP protocol with an Extensible Markup Language (XML) serialization in conjunction with other Web-related standards.

A Web Application Programming Interface (API) is an interface between a Web service or Web application and a Web server that allows redirecting a request towards the Uniform Resource Locators (URL) of the requested Web services.

When used in the context of Web development, a Web API is typically a defined set of Hypertext Transfer Protocol (HTTP) request messages along with a definition of the structure of response messages, usually expressed in an Extensible Markup Language (XML) or JavaScript Object Notation (JSON) format.

Nowadays Web API allows combining multiple Web services and applications into new applications known as mashups.

However, when running composite Web services, the requesting Web server must send as much as requests than the requested Web services before consolidating information and sending back the mashup result. This is time consuming and cumbersome.

In language programming, the well-known Command Line Interface (CLI) is the appropriate tool for interfacing with a computer operating system such as UNIX or Windows. CLI users enter commands in a text mode to define one or several operations to be executed by the computer system. Upon completion, the result is provided in the form of text lines on the Command Line Interface. There exists today some users interface for using CLI which are named "CLI shell" that allow to have various commands to be executed by a respective operating system. Most popular are the UNIX shell, the cmd.exe shell or the COMMAND.COM shell to name a few.

Whereas CLI offer interface with extensive dialog possibilities, and consequently CLI are mainly used by programmers, developers and system administrators as it requires knowledge of language queries, their use is limited to execution of operating system commands.

So, there is not today any interface, whether CLI, API or any other one that allows entering one request to address several web services or applications. And there is a need for a Web server that does not require running successive requests to Web services and Web applications to provide a composite application.

Finally, there is a need for a solution that removes the aforementioned drawbacks. The present invention offers such solution.

SUMMARY OF THE INVENTION

According to a first aspect of the present invention, there is provided a method as further described in the appended independent claim 1.

Particularly, a method for providing composite web application comprises the steps of:
receiving a client request in the form of an API language request, wherein the client request further comprises a plurality of command line interface (CLI) commands for querying Web services;
generating an Abstract Syntax Tree (AST) from the client request, wherein the AST comprises syntax nodes and command nodes and at least one command node being associated to at least one request to Web services;
executing the Abstract Syntax Tree, wherein each command node execution further comprises:
sending to a Web service, a web service request in the form of an API language of the corresponding requested Web service;
receiving from the corresponding requested Web service the web data sent back; and
storing the web data received as the response of the execution step;
combining the stored web data into a composite data structure; and
sending the composite data structure in the form of an API language response.

Further embodiments are described in the appended dependent claims.

According to a second aspect of the present invention, there is provided an apparatus comprising means adapted for carrying out each step of the method according to the first aspect of the invention.

According to a third aspect of the present invention, there is provided a computer readable medium having encoded thereon a computer program comprising instructions for carrying out the steps of the method when the computer program is executed on a computer.

Further advantages of the present invention will become clear to the skilled person upon examination of the drawings and detailed description. It is intended that any additional advantages be incorporated therein.

BRIEF DESCRIPTION OF THE DRAWINGS

Embodiments of the present invention will now be described by way of example with reference to the accompanying drawings in which like references denote similar elements, and in which.

DETAILED DESCRIPTION OF THE PREFERRED EMBODIMENT

Figure 1:
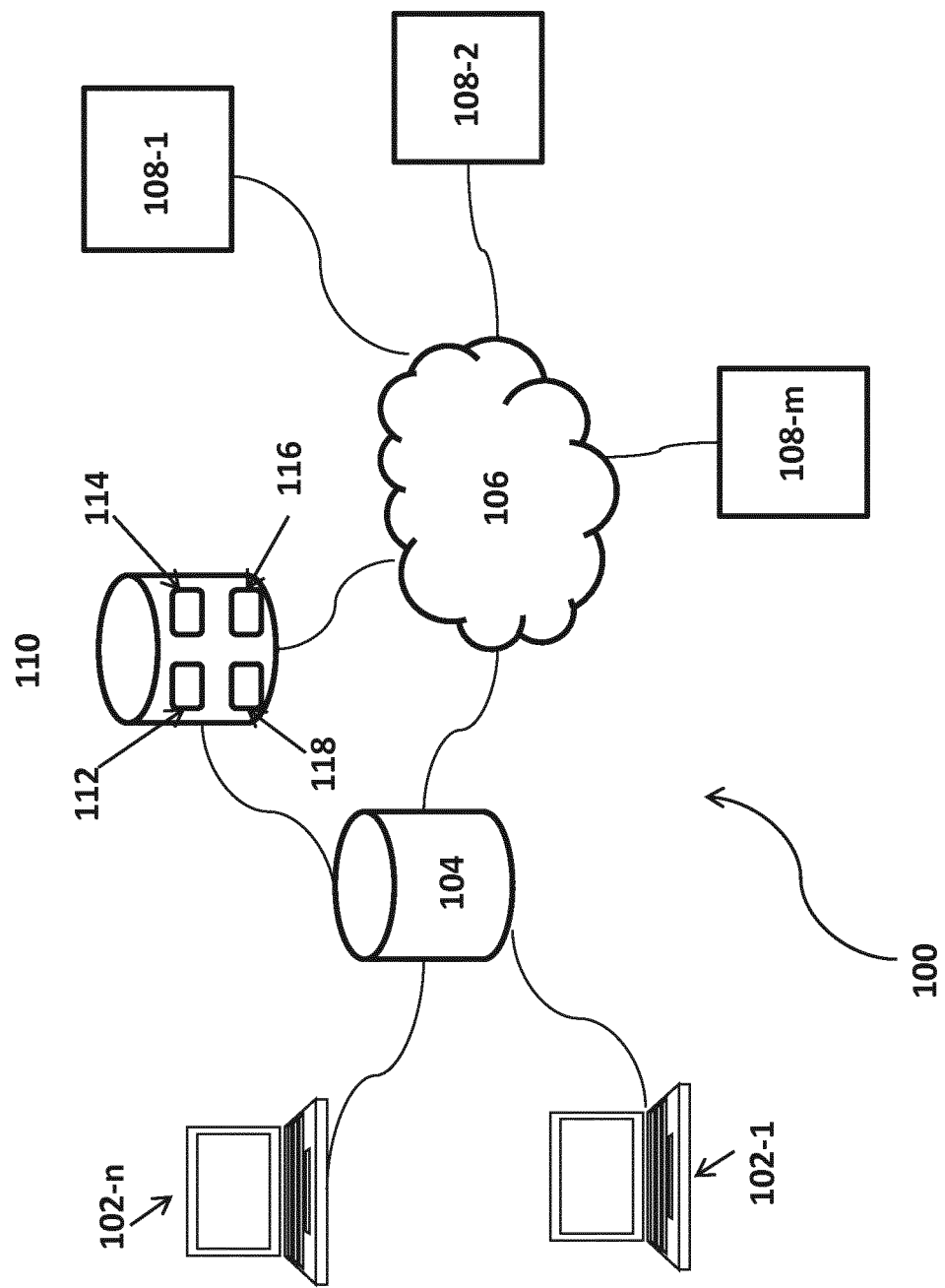
FIG. 1 is a block diagram of a web environment for operating embodiments of the present invention.

With reference to FIG. 1, a block diagram of a web environment 100 for operating the present invention is depicted in accordance with a preferred embodiment.

The web environment 100 includes a client computer 102-1. The client computer may be any general purpose user computer, laptop, personal digital assistants, cellular phones or the like from which a user may access a network 106. For sake of clarity, only one client computer is described but the skilled person will appreciate that the description is illustrative and will easily devise that the invention may run for a plurality of client computers 102-n.

The client computer may access the network either directly or through a client server 104. The network may be the internet or an intranet network. In the rest of the description the network is intended to be the internet or World Wide Web network and the client server 104 a client web server.

The web server 104 may access the internet either directly or through a webshell server 110 to execute web services or web applications 108-1 to 108-m for a user request received from client computer 102-1.

The functionalities of the webshell server 108 of the present invention may be implemented on a general purpose server whether private or virtual one and may operate on well-known operating systems.

In a preferred implementation, the webshell server of the present invention operates on an Apache Debian/LINUX server, using the MySQL database with PHP v5.3+.

The webshell server comprises a parsing module 112 to receive a complex request having both API language syntax and CLI language commands into.

An example of such mixed request is as follows:
http://webshell.fr/api?request={CLI_webshell}

Another example of the structure of a request is proposed at the end of the description to illustrate the characteristic of mixing both API language syntax and CLI commands in a unique request to be processed by the system of the present invention. It is important to note that the script language used for the CLI commands may be a 'Javascript' language or any variation such as 'Coffeescript' or 'Typescript' language.

The person skilled in the art will appreciate that some variations are applied to the process of the invention described below, depending on the language used, whether the language is an interpreted language (Javascript, Ruby, Python, php), a compiled language (C, C++, . . . ) or a semi-complied language (Java c#). Particularly, the webshell server may run a different routine to execute the code receives according to the language used. For an interpreted language, the code is executed by the language interpreter (nodejs, ruby, tec). For a complied language, the code is compiled at the webshell server and the resulting binary code is executed. For a semi-compiled language, the code is complied in a byte code which is executed by a Virtual Machine (VM) such as a jvm for Java for example.

In a preferred implementation, the Webshell API is a Representational State Transfer (REST) API allowing using a 'Request' parameter to execute script code.

The REST API may be executed from any navigator such as Internet Explorer, Firefox, Chrome, Safari to name a few.

The webshell server further comprises an interpreter module 114 to transform the complex request into an Abstract Syntax Tree (AST) and to execute each node of the tree.

The AST can be build by interpreters like the 'node.js' or 'php' ones or with other ones known by those skilled in the art.

An abstract syntax tree which is a well-known structure for programmers is a tree representation of the abstract syntactic structure of source code written in a programming language. Each node of the tree denotes a construct occurring in the source code. The syntax is 'abstract' in the sense that it does not represent every detail that appears in the real syntax. For instance, grouping parentheses are implicit in the tree structure, and a syntactic construct such as an if-condition-then expression may be denoted by a single node with two branches.

An exemplary of the AST structure of the present invention will be detailed below with reference to FIG. 3.

The webshell server 110 further comprises a storage module 116 allowing storing script command of the received complex request and storing data received back from the requested web services.

The webshell server is further equipped with an encoding module 118 to combine all data stored into a global data structure to be sent to the originated client computer as the response to the original request.

Whereas the webshell server 110 is shown and described as a remote server from the client server, it is to be appreciated that the webshell server may be implemented as part of a client server without departing from the scope of the present invention.

As said, the invention offers new functionalities for a server, herein called webshell server, allowing communicating in one request, having command line interface commands, with multiple web services and web applications. The webshell server of the present invention allows executing and combining a plurality of web services from a unique request.

Figure 2:
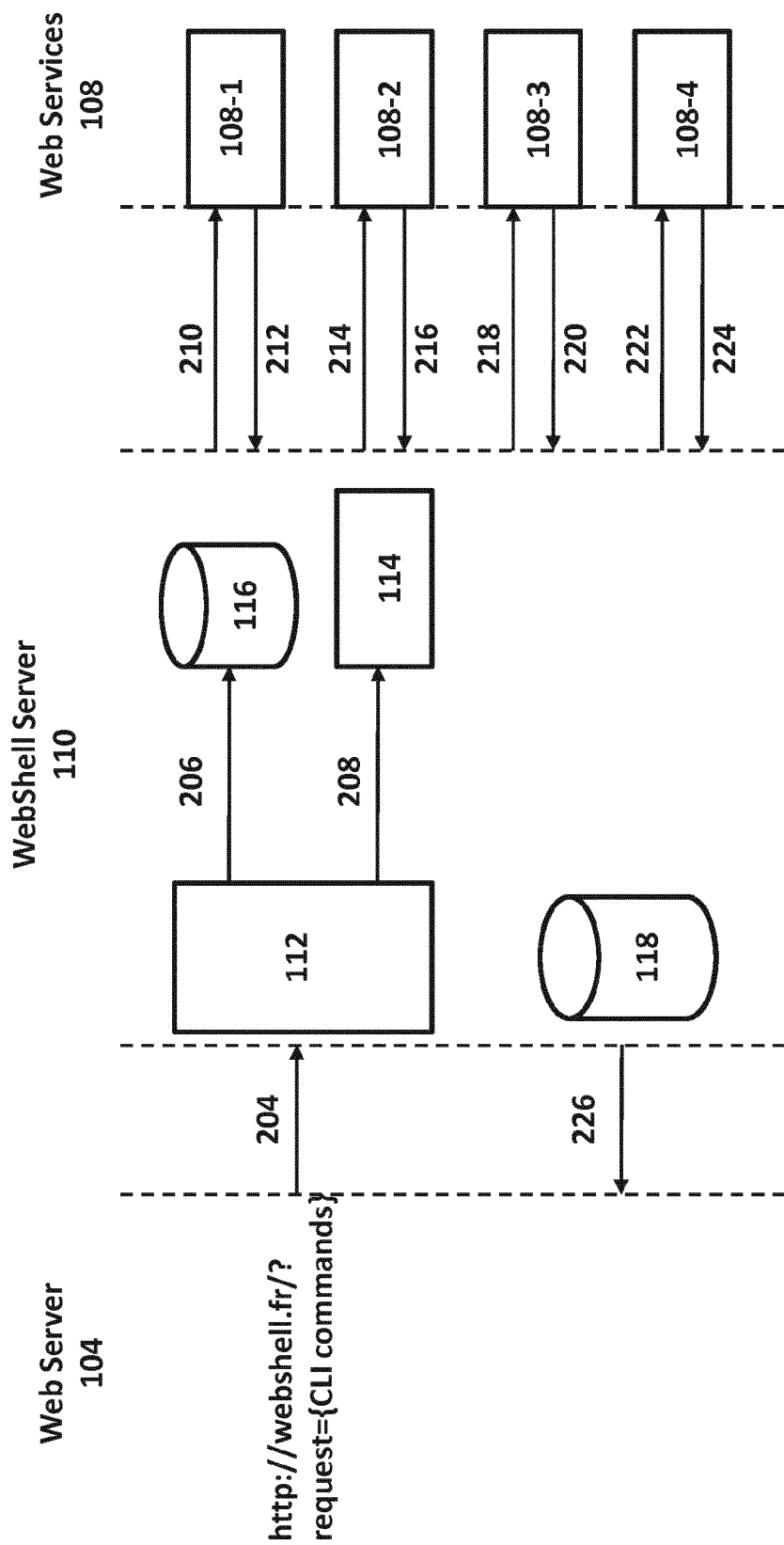
FIG. 2 is a component-level flow diagram illustrating Web server's interoperability in accordance with an embodiment of the present invention.

Going to FIG. 2, a component-level flow diagram illustrating Web server's interoperability in accordance with an embodiment of the present invention is now described.

A web server 104 sends a request 204 to the webshell server 110.

An example of such request is as follow:

```
*******************************************************************
http://webshell.fr/api?request=a%20:%20{%20@foursquare%20paris%20},b%20:%20{%
20gmaps%20},%20foreach%20place%20in%20a%20{gmaps%20#{ return b.pid } -
addmarker place.lng place.lat, Google place.name, Wikipedia place.name }
*******************************************************************
```

As shown, the request contains the standard API language of Hypertext Transfer Protocol (HTTP) request for declaring the webshell server, plus CLI language script to list all the web services to be requested and data required for this request.

The request includes commands in script language to execute web services, either at the server side and/or at the user side, by the user web navigator. For request in object language, the commands are objects.

In the example, four web services are listed: Foursquare, Google Maps, Wikipedia and Google. It is to be appreciated that those services are used for purpose of illustration but are not intended to limit the number and kind of web services to be requested by the webshell server of the present invention. Moreover, the web services herein listed are property of their authors.

At the webshell server side, the request is assigned to a dedicated process to execute the global request including all the services.

The request is parsed in a parsing module 112 and the script 206 included in the request is stored in memory storage 116.

From the above example, the script stored is as follow:

```
**************************************************
a : { @foursquare paris },
b : { gmaps }
foreach place in a {
    gmaps #{ return b.pid } -addmarker place.lng place.lat
    google place.name
    wikipedia place.name
}
**************************************************
```

Simultaneously, the code 208 contained in the request is used by the interpreter 114 to generate the Abstract Syntax Tree having nodes corresponding to the web services.

Figure 3:
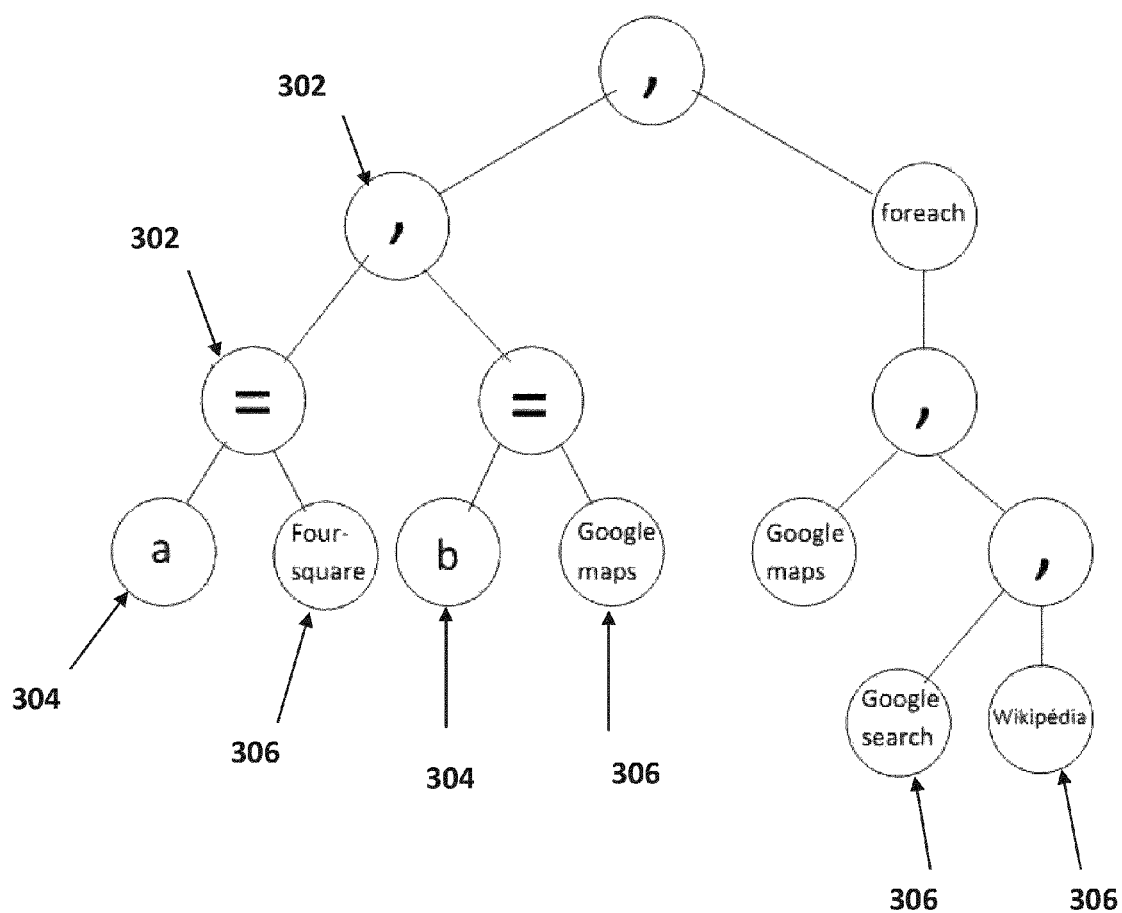
FIG. 3 exemplifies an AST structure in the embodiment of FIG. 2.

FIG. 3 illustrates the general structure of the AST generated for the previous example. As shown on FIG. 3, the tree comprises different kind of nodes (302, 304, 306) among which syntax nodes (302, 304) and command nodes (306).

The command node may run for any APIs and Web services to generate composite web services, web applications or mash-ups. The resulting mash-ups may be used as new commands to be executed in command nodes and generate new and more advanced web services and mash-ups.

For purpose of the example, two nodes have been illustrated with a content set as variables 'a' and 'b'. It is one advantage of the present invention to temporary set the value of a variable to the web data received in response to a previous web service request and to combine the value of the variable with a next web service request.

Coming back to FIG. 2, the web service corresponding to a first command node in the AST, herein "foursquare", is queried to search for 'Paris'. The query 210 is in the form of an API web request as follows:
https://api.foursquare.com/v2/venues/search?ll={lat},
{long}

In return, the web service sends back to the webshell server the appropriate respective response 212, herein the locations in Paris.

The memory storage allows storing the first response as first variable 'a'. For sake of clarity, the memory storage is illustrated as single zone storage within the webshell server, but alternatively, two or more memories may be used to store the script and the content of the variables.

Simultaneously, the content of the first response is stored as parts of the encoding module 118 to build a global data structure along the execution of the AST to provide a final response to the web server.

Next, the AST declares execution of the next {gmaps} command, a corresponding request 214 is sent to web service 'Google Maps' as follow:
http://maps.google.com/maps/api/
    js?sensor=false&callback=initialize The content of the 'Google Maps' response 216 is stored as variable 'b'. Simultaneously, the content of the second response is stored as part of the encoding module 118.

As can be seen on FIG. 3, the next AST execution runs a loop process "foreach" to search for each location identified by 'Google Maps'.

As the next web service to be queried is 'Google', a request in the form of an API request 218 is sent to 'Google' as follows:
http://ajax.googleapis.com/ajax/services/search/
    web?v=1.0&q=Place The content of the 'Google' response 220 is stored only as part of the encoding module 118 as no variable has been declared for this command.

The last web service 'Wikipedia' is queried in the form of an API request 222 as follows:
http://fr.wikipedia.org/w/
    api.php?action=opensearch&search=Place&forma t=json The content of the 'Wikipedia' response 224 is stored only as part of the global data structure as no variable has been declared with this command.

Finally, the encoding module 118 allows encapsulating the data stored from all responses during the AST execution process.

The process allows applying the appropriate action to each response collected. For example, if a 'jsClient Api' object, its initialization is executed, instantiated, loaded and then all calls from this object are executed, such as for example zooming a map.

Finally, a global data structure 226 is send to web server 104.

The global data structure 226 is in the form as follow:

```
**************************************************
[{
"pid":26,
"data":{
    //foursquare data
},
"cmd":"foursquare" ,
"icon":"\images\foursquare-icon.png",
"title":"Foursquare",
"hascallback":false,
"renderScript":"cmd\foursquare\foursquare.phtml",
"outType":"normal",
"error":false,
"view":"Foursquare view"
},
{
"exectype":"ret",
"data":{
"pid":27,
"data":[ ],
"cmd":"gmaps",
"icon":"\images\google-icon.png",
"title":"Google Maps",
"hascallback":true,
"renderScript":"cmd\gmaps\display.phtml",
"outType":"normal",
"error":false
}
},
{
"pid":28,
"data":{
    //Google data
```

-continued

```
},
"cmd":"google",
"icon":"\/images\/google-icon.png",
"title":"Google Search",
"hascallback":false,
"renderScript":"cmd\/google\/google-web.phtml",
"outType":"normal",
"error":false,
"view":"Google view"
},
{
"pid":29,
"data":{
    //Wikipedia data
},
"cmd":"wikipedia",
"icon":"\/images\/wikipedia-icon.png",
"title":"Wikipedia",
"hascallback":false,
"renderScript":"cmd\/google\/google-web.phtml",
"outType":"normal",
"error":false,
"view":"Wikipedia view"
}]
***************************************************************
```

Preferably, the global data structure is built during the execution of the AST as a table having one or several entries, each entry pointing to one response to a web service request.

Each entry contains one or more attributes such as errors, view to be displayed, data table, title, identifier, process and so. Each attribute further contains an associated value which may be either a simple, value such as an integer, a string, a float or a complex value such as a table or an object.

Figure 4:
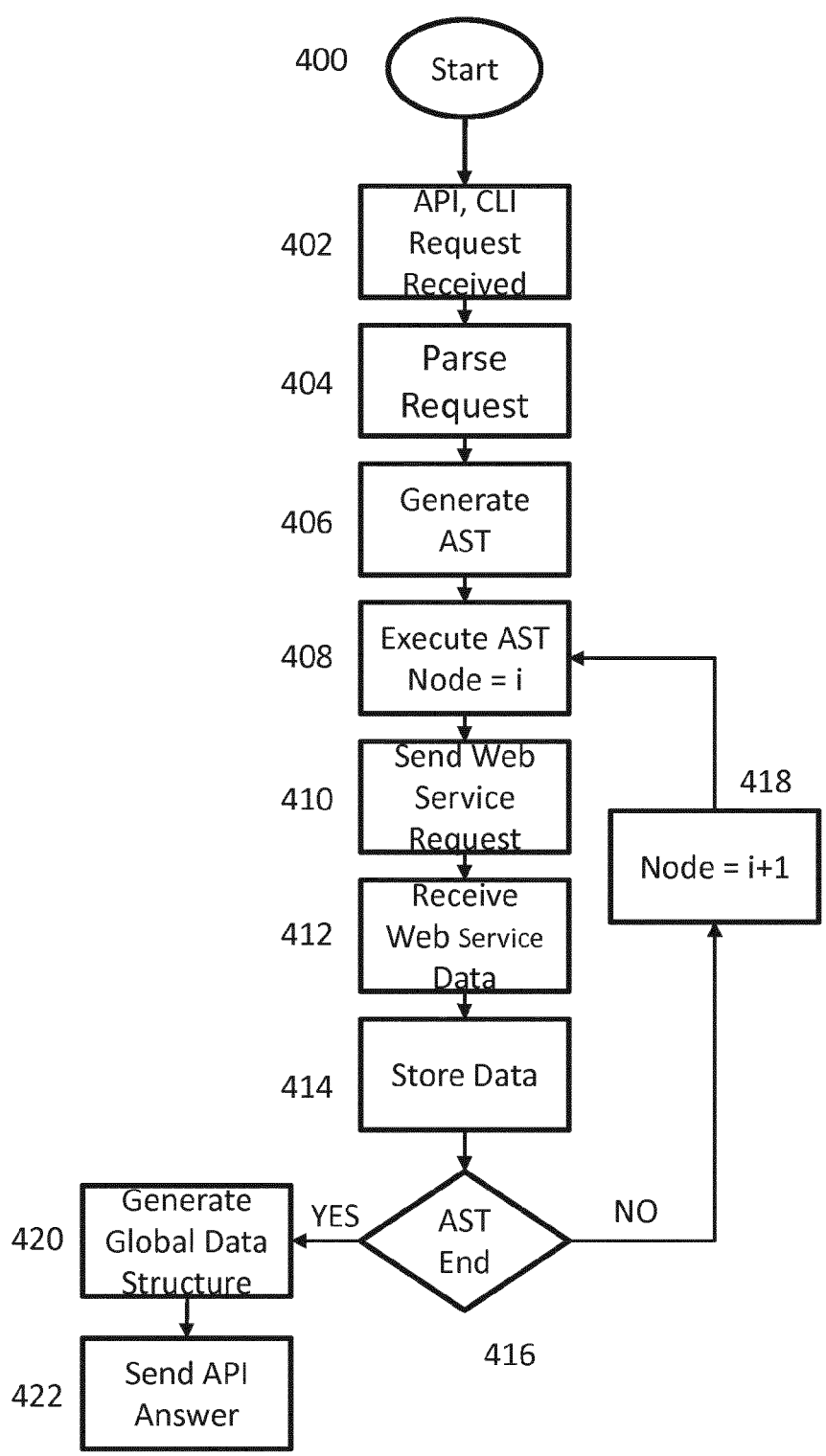
FIG. 4 is a flowchart of a method followed by a web shell server in accordance with an embodiment of the present invention.

Turning to FIG. 4, a flow diagram describing a process 400 for providing composite web applications is now described.

Process 400 begins when a complex request is received at the webshell server on step 402. The complex request is received through an API and contains all the calls to the requested web services under script CLI language.

It is one advantage of the present invention to include easily in the originating request any specific CLI command corresponding to any respective Web service or web application. When a new CLI command is added to a request, a XML file is generated having information relative to the specific command to simplify the command processing and to process errors.

On next step 404, the request is parsed and all script code is stored in memory storage 116. The request is executed simultaneously to the execution of the script code as follow.

At step 406, an Abstract Syntax Tree is generated from the code of the request. The AST comprises nodes and branches to be interpreted in a loop mode 408.

In an alternate embodiment, during the AST generation, the process allows checking if a token value is defined as an alias and if so, the token is set to the corresponding value. webshell server For example in the following command:
"link g google, g video game"
The token 'g' is defined as an alias pointing to 'google' and during the AST execution, each time token 'g' is encountered, the value is directly replaced by 'google'. Those skilled in the art will appreciate that a 'link' command as above allows declaring an URL to an API, and so to replace it dynamically during the AST execution.

A first node of the AST is executed on step 410, and the received response (step 412) is stored (step 414) as a first response within a global data structure. The response may also be stored as a variable to be later used during the AST execution.

On step 416, a test is performed to determine if all nodes of the AST have been executed and if not the process checks for the next node (step 418) and returns to step 408.

When all nodes have been run (branch Yes of step 416), the process continues with step 420, where all data, corresponding to the execution of all the APIs and stored in a global data structure on step 414, are encapsulated in a final data structure.

Finally on step 422, the final data structure is send to the request originator.

In a preferred embodiment the final data structure is in JSON language.

It is appreciated that the process run at the webshell server of the present invention, either for a web service request or for an internal API request, allows sending back a result in a form that is directly to be used by the user navigator.

Particularly, the process of the present invention allows building a final data structure that contains all information necessary to execute an API, such as: the initialization information, the loading information, the building information, and the interface including the various calls. Each call within the final data structure is executed when the request is executed and each result is added to the final data structure with the corresponding call information.

Additionally, the process may include an authentication step before processing a client request. The authentication may be in the form of using an API secret key at the client server side and sending the client request to the webshell server through a Secure Socket Layer (SSL) connection. Authentication requests are processed at the webshell server and key access, such as the Open Authorization (OAuth) one may be exchanged securely between the client server and the web services providers.

To recall, the present invention take advantage of using requests mixing both API language and CLI language. The request processing is partially executed on the webshell server, on the client server and on the end user computer. This allows monitoring transparently asynchronous as well as synchronous calls request.

For the purpose of illustration, another example of a request as used by the present invention is provided. A user wants to display from 'Google Maps' the railway stations 'SNCF gares' plus having from 'Foursquare' all the 'coffee bars' around the fifth railway station.

Then, the request is defined as follow:

```
*******************************************
    var m = apis.google.maps( );
    m.center('paris');
    m.zoom(18);
    var gares = apis.sncf.gares( );
    for (var i = 0; i < gares.length; i++) {
        maps.addMarker(gares[i]);
        if (i == 4) { //5eme gares car ça commence a 0
            var bars = apis.foursquare.searchVenue({
                q: 'bar',
                center: gares[i],
                radius: 2000 //rayon de 2km
            });
            for (var x = 0; x < bars.length; i++) {
                var bar = bars[i].venue;
                m.addMarker(bar.location);
            }
        }
    }
*******************************************
```

The request is sent to the Webshell server (110).

The Webshell server run the API 'apis.google.maps( )' (108). The latter sends back a view having javascript language (jsClientApi) allowing to further execute functions such as 'center, zoom, addmarker'. The 'Google maps' is stored for the final answer (118).

The Webshell server allows executing synchronously the request to get the list of the railway stations and stores the list as a variable 'gare'. Then, for each railway station, a marker is added on the 'Google Maps' by adding a "addmarker( )" call within the final data structure.

Then the process allows searching with 'Foursquare' for the coffee bars around the fifth railway station by executing an API request. The answer is stored in the "bars" variable.

For each coffee bar found, a "addmarker( )" call is added within the final data structure to allow identifying the coffee localization.

The final answer is a file in a 'JSON' (JavaScript Object Notation) format including all the 'html' data from the map creation plus all the 'javascript' calls to be executed to get the answer to the initial request.

Finally, it is to be appreciated that the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

To recall, the present invention offers an innovative and major advance in Web services environment by allowing a combination of successive executions of Web services or applications. To achieve, the method of the present invention allows to store the results of web requests and to later use those results for subsequent web service requests. The particular combination of API and CLI languages allows declaring as new variables, both simple variables and complex variables. To summarize, the present invention allows processing composite web requests from one client request including CLI commands that are interpreted and executed using an Abstract Syntax Tree (AST). The method described allows thus executing Web services with request having CLI commands. The proposed novel approach is a basis for a web operating system or a cloud operating system.

The invention claimed is:

1. A method for providing composite web application comprising the steps of:
    receiving, at a webshell server, a client request from a client server in the form of an API language request, wherein the client request further comprises a plurality of command line interface (CLI) commands for querying Web services;
    generating, at a webshell server, an Abstract Syntax Tree (AST) from the client request, wherein the AST comprises syntax nodes and command nodes and at least one command node being associated to at least one request to the Web services;
    executing, at a webshell server, the Abstract Syntax Tree, wherein each command node execution further comprises:
        sending to a Web service, a web service request in the form of an application program interface (API) language of the corresponding requested Web service;
        receiving from the corresponding requested Web service the web data sent back; and
        storing the web data received as the response of the execution step;
    combining, at a webshell server, the stored web data into a composite data structure; and
    sending, at a webshell server, the composite data structure in the form of an API language response to a client computer.

2. The method of claim 1, wherein the web service request comprises web data previously stored.

3. The method of claim 1, wherein the client request is received through Hyper-text Transfer Protocol (HTTP) protocol and the plurality of CLI commands are script codes.

4. The method of claim 1, wherein the generating step comprises parsing the client request for identifying script code of each CLI command and interpreting script code for generating the AST.

5. The method of claim 1, wherein the combining step comprises the step of encapsulating the stored web data.

6. The method of claim 1, wherein the storing step further comprises the step of storing the web data as a variable in a node of the AST.

7. The method of claim 1, wherein the client request is received from a remote server having a plurality of client computers operatively coupled to.

8. The method of claim 1, wherein the composite data structure is based on JavaScript Object Notation (JSON) language.

9. The method of claim 1, wherein at least one of the requested Web services is a remote Web service.

10. The method of claim 1, wherein the API of the client computer is a Web browser.

11. An apparatus comprising means adapted for carrying out each step of the method according to claim 1.

12. A computer readable medium having encoded thereon a computer program comprising instructions for carrying out the steps of the method according to claim 1 when said computer program is executed on a computer.

* * * * *